(12) United States Patent
Paddick et al.

(10) Patent No.: US 11,189,996 B2
(45) Date of Patent: Nov. 30, 2021

(54) MODULAR DISTRIBUTION BOX FOR CABLES

(71) Applicant: Prysmian S.p.A., Milan (IT)

(72) Inventors: Nathan Paddick, Milan (IT); Luigi Russo, Milan (IT)

(73) Assignee: PRYSMIAN S.P.A., Milan (IT)

( * ) Notice: Subject to any disclaimer, the term of this patent is extended or adjusted under 35 U.S.C. 154(b) by 21 days.

(21) Appl. No.: 16/796,703

(22) Filed: Feb. 20, 2020

(65) Prior Publication Data
US 2020/0274339 A1 Aug. 27, 2020

(30) Foreign Application Priority Data
Feb. 21, 2019 (IT) .................. 102019000002551

(51) Int. Cl.
*H02G 3/08* (2006.01)
*G02B 6/44* (2006.01)
*H01R 13/514* (2006.01)
*H02G 3/06* (2006.01)

(52) U.S. Cl.
CPC ........... *H02G 3/086* (2013.01); *G02B 6/4446* (2013.01); *H01R 13/514* (2013.01); *H02G 3/0608* (2013.01)

(58) Field of Classification Search
CPC ........ H02G 3/086; H02G 3/0608; H02G 3/08; H02G 3/081; H02G 3/085; G02B 6/446; H05K 5/00; H05K 5/02; H05K 5/0204; H05K 5/0217; H01R 13/514; H01R 13/46; H01R 13/501; H01R 13/506; H01R 13/516

USPC ................ 174/480, 481, 50, 53, 57, 58, 59; 220/3.2–3.9, 4.02; 248/906

See application file for complete search history.

(56) References Cited

U.S. PATENT DOCUMENTS

| | | | | |
|---|---|---|---|---|
| 4,612,412 A | * | 9/1986 | Johnston ................ | H02G 3/086 174/57 |
| 5,169,013 A | * | 12/1992 | Lammens, Jr. ........ | H02G 3/083 174/650 |
| 5,378,854 A | * | 1/1995 | Hoover .................. | H02G 3/086 174/53 |
| 5,574,255 A | * | 11/1996 | Simmons ............... | H02G 3/086 174/53 |

(Continued)

FOREIGN PATENT DOCUMENTS

| | | |
|---|---|---|
| DE | 20106236 U1 | 6/2001 |
| EP | 1209785 A1 | 5/2002 |

(Continued)

*Primary Examiner* — Angel R Estrada
(74) *Attorney, Agent, or Firm* — Slater Matsil, LLP

(57) ABSTRACT

A distribution box for cables, the distribution box comprising a plurality of modules arranged in a stacked relationship along a longitudinal direction, the plurality of modules comprising: a base module having an inlet port for receiving one or more cables, a cap module, one or more distribution modules arranged between the base module and the cap module, each distribution module having one or more outlet ports. Attachment members are formed on each module for attaching longitudinally the stacked modules, a retaining element is provided and configured to act on the base module and the cap module to mutually urge the stacked modules along the longitudinal direction.

21 Claims, 6 Drawing Sheets

(56) References Cited

U.S. PATENT DOCUMENTS

| | | | | |
|---|---|---|---|---|
| 6,057,509 | A * | 5/2000 | Simmons | H02G 3/086 |
| | | | | 174/53 |
| 6,576,835 | B1 * | 6/2003 | Ford | H02G 3/086 |
| | | | | 174/135 |
| 7,211,727 | B2 * | 5/2007 | Pearse | H01R 13/745 |
| | | | | 174/481 |
| 7,659,478 | B2 * | 2/2010 | Schlachter | H02G 3/086 |
| | | | | 174/58 |
| 7,862,352 | B2 * | 1/2011 | Parrish | H01R 13/447 |
| | | | | 439/142 |
| 8,212,144 | B1 * | 7/2012 | Gretz | H02G 3/086 |
| | | | | 174/58 |
| 8,383,937 | B2 * | 2/2013 | De Ambroggi | H02G 3/121 |
| | | | | 174/58 |
| 2003/0129869 | A1 | 7/2003 | Milan | |
| 2015/0378122 | A1 | 12/2015 | Simmons | |

FOREIGN PATENT DOCUMENTS

| | | |
|---|---|---|
| EP | 1249913 A2 | 10/2002 |
| WO | 2017120059 A1 | 7/2017 |

* cited by examiner

MODULAR DISTRIBUTION BOX FOR CABLES

CROSS-REFERENCE TO RELATED APPLICATIONS

This application claims the benefit of Italian Patent Application No. 102019000002551 filed on Feb. 21, 2019, which application is hereby incorporated herein by reference.

TECHNICAL FIELD

The present invention relates to the field of fiber to the antenna (FTTA) application.

BACKGROUND

Typically, a modular distribution box comprises a plurality of modules to satisfy the requirements for a specific FTTA network. In fact, most of the modules provide one or more connection ports, whereby the whole distribution box will achieve the total desired number of connection ports.

The modules are fixed one to each other with a combination of screws increasing the complexity of the distribution box. Specifically, the use of the screws for connecting each module to the adjacent one slows down installation work and makes maintenance of the distribution box more difficult.

US 2015/0378122 discloses a modular breakout device providing optical and/or electrical connection interfaces in each modular unit. The exemplary breakout device includes a housing made up of a plurality of individual compartments stacked upon each other and a cover that is attachable to the housing. The plurality of individual compartments includes a base compartment configured with a port, through a wall of the base compartment, that is configured to accept optical and/or electrical transmission media and a first furcation tray. The first furcation tray is disposed on top of the base compartment and the cover is disposed on top of the first furcation tray to enclose the housing. In one exemplary aspect, the breakout device has an optical connection interface and an electrical connection interface disposed in a side wall of the first furcation tray.

EP 1249913 discloses an electrical distributed housing which has an entry point for a cable and at least two outlet points for branch cables. The number of outlet points can be expanded by adding more inter-connecting modules. Each module has a mechanical and electrical connection with the next module and has a cuboid shape.

SUMMARY

Embodiments of the present application provide a distribution box for cables allowing an easy and quick assembly of the different modules without the need of screws.

The Applicant has found that providing attaching members formed on each module for attaching longitudinally the stacked modules allow a fast assembly of the box itself. Further stability is given by a retaining element urging the stacked modules along the longitudinal direction.

Therefore, embodiments of the present invention relate to a distribution box for cables, the distribution box comprising a plurality of modules arranged in a stacked relationship along a longitudinal direction, the plurality of modules comprising a base module having an inlet port for receiving one or more cables, a cap module, one or more distribution modules arranged between the base module and the cap module, each distribution module having one or more outlet ports, wherein attachment members are formed on each module for attaching longitudinally the stacked modules, a retaining element is provided and configured to act on the base module and the cap module to mutually urge the stacked modules along the longitudinal direction.

Preferably, the attachment members comprise one or more seats and one or more protrusions configured to engage and fit in a respective seat for attaching longitudinally the stacked modules.

Preferably, the attachment members are configured to removably fix the stacked modules.

Preferably, each module has at least one connecting portion facing the connecting portion of a stacked module, the attachment members being formed on the connecting portions.

Preferably, the attachment members are spaced apart along the connecting portion.

Preferably, the connecting portion has an outer peripheral surface and the attachment members are arranged within or flush with the outer peripheral surface.

Preferably, the attachment members comprise lower attachment members and upper attachment members formed on each distribution module, upper attachment members formed on the base module, lower attachment members formed on the cap module, the lower attachment members of a module are configured to attach with the upper attachment members of a stacked module along the longitudinal direction.

Preferably, the distribution box comprising a plurality of distribution modules comprising a first distribution module and a second distribution module, wherein the upper attachment members of the first distribution module are configured to attach interchangeably with the lower attachment members of the second distribution module and with the lower attachment members of the cap module, and the lower attachment members of the first distribution module are configured to attach interchangeably with the upper attachment members of the second distribution module and with the upper attachment members of the base module.

Preferably, each distribution module extends between a lower connecting portion and an upper connecting portion defining respectively a lower opening and an upper opening and comprises a passing through channel extending between the lower opening and the upper opening to allow passage of optical or electrical conductors of the cables from the inlet port of the base module to the outlet ports of each distribution module.

Preferably, the passing through channels of the distribution modules define an inner volume extending between the base module and the cap module, one or more seals are arranged at the facing connecting portions between stacked modules for sealing the inner volume.

Preferably, the retaining element extends between a lower portion and an upper portion along the longitudinal direction and acts on a lower portion of the base module and on an upper portion of the cap module.

Preferably, the retaining element comprises lower retention members and upper retention members cooperating with lower retention members and upper retention members formed respectively on the lower portion of the base module and the upper portion of the cap module.

Preferably, the retaining element comprises a first side wall extending between the lower portion and upper portion of the retaining element and facing a first side portion of each module.

Preferably, the retaining element comprises a second side wall projecting from the first side wall along a transverse direction perpendicular to the longitudinal direction and partially surrounding a second side portion of each module adjacent to the first side portion.

BRIEF DESCRIPTION OF THE DRAWINGS

The present invention will now be described in more detail hereinafter with reference to the accompanying drawings, in which some embodiments of the invention are shown.

DETAILED DESCRIPTION OF ILLUSTRATIVE EMBODIMENTS

Figure 1:
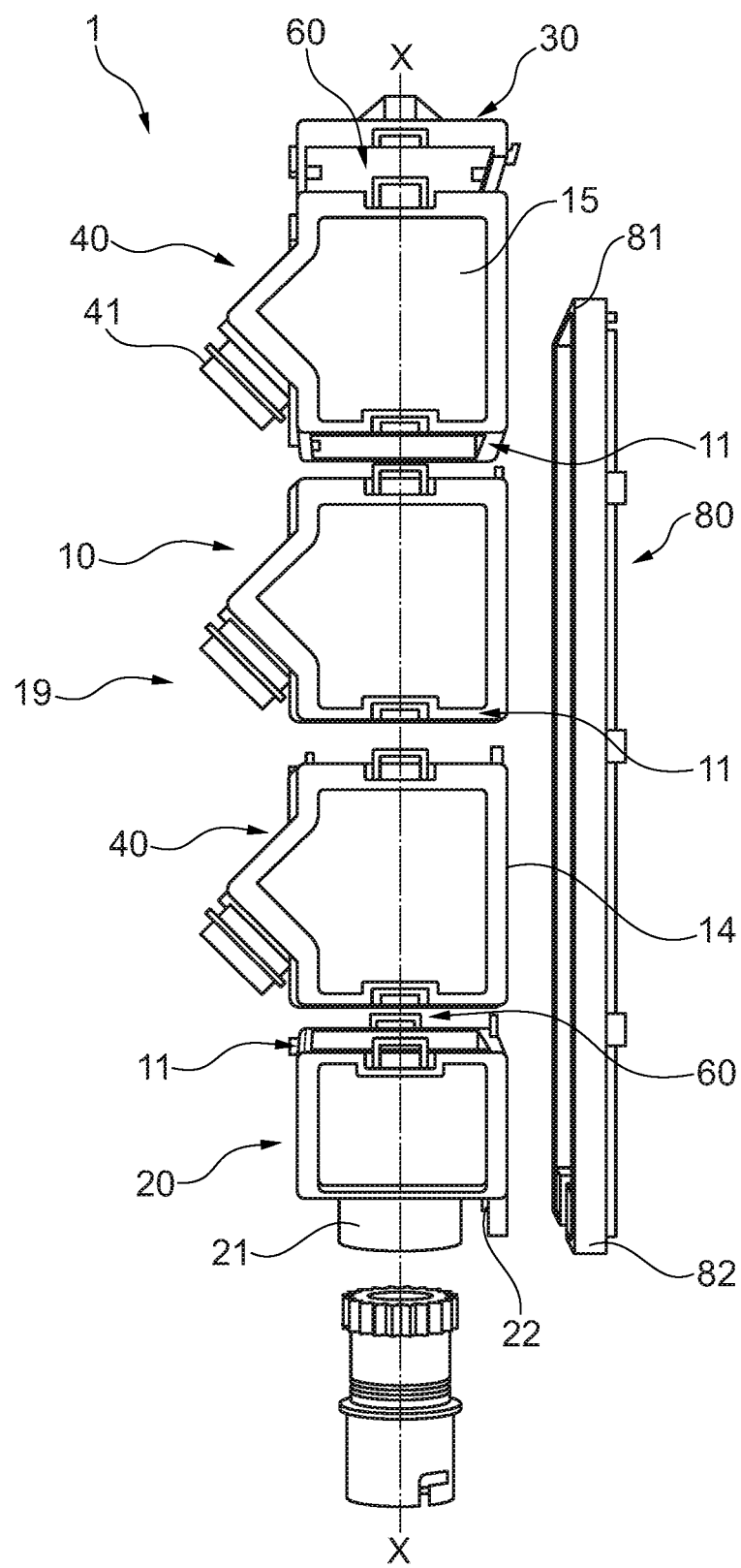
FIG. 1 is an exploded view of a modular distribution box for cables according to one embodiment of the present invention.
Figure 2:
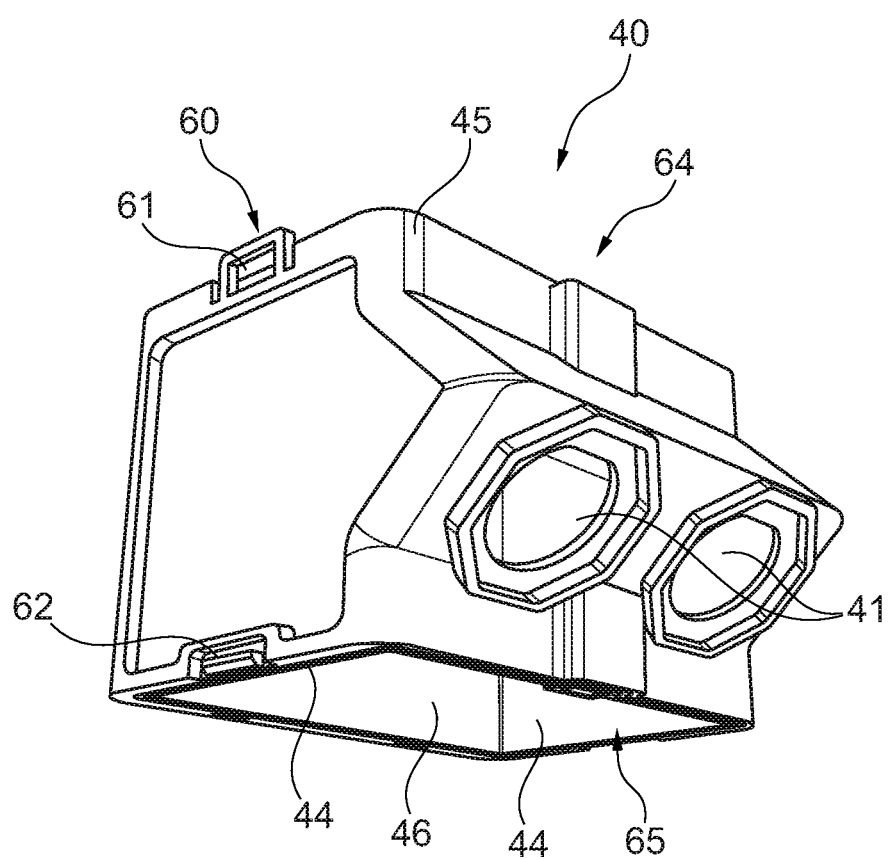
FIG. 2 is a perspective view of a distribution module of the modular distribution box of the FIG. 1.
Figure 3:
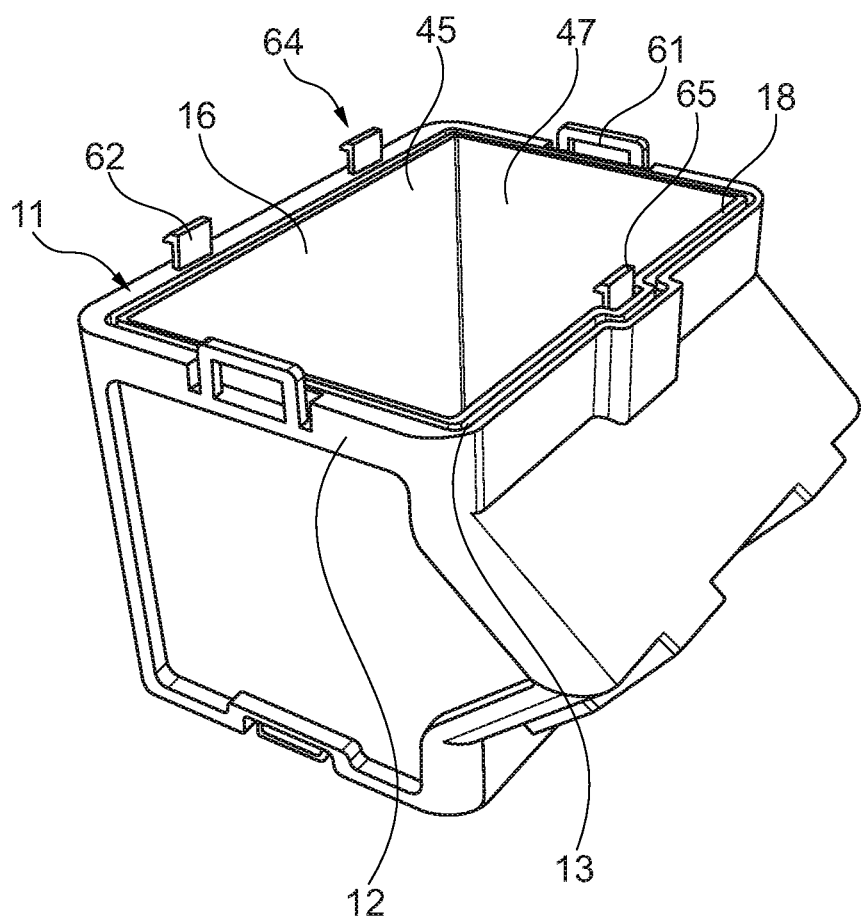
FIG. 3 is a perspective view of distribution module of the modular distribution box of the FIG. 1.
Figure 4:
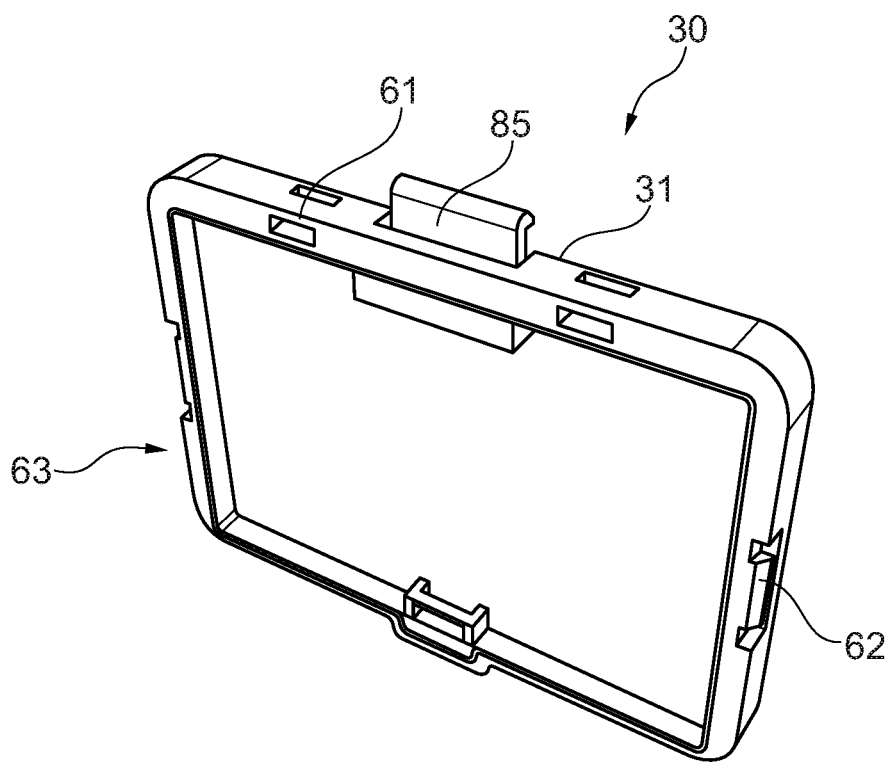
FIG. 4 is a perspective view of a cap module of the modular distribution box of the FIG. 1.
Figure 5:
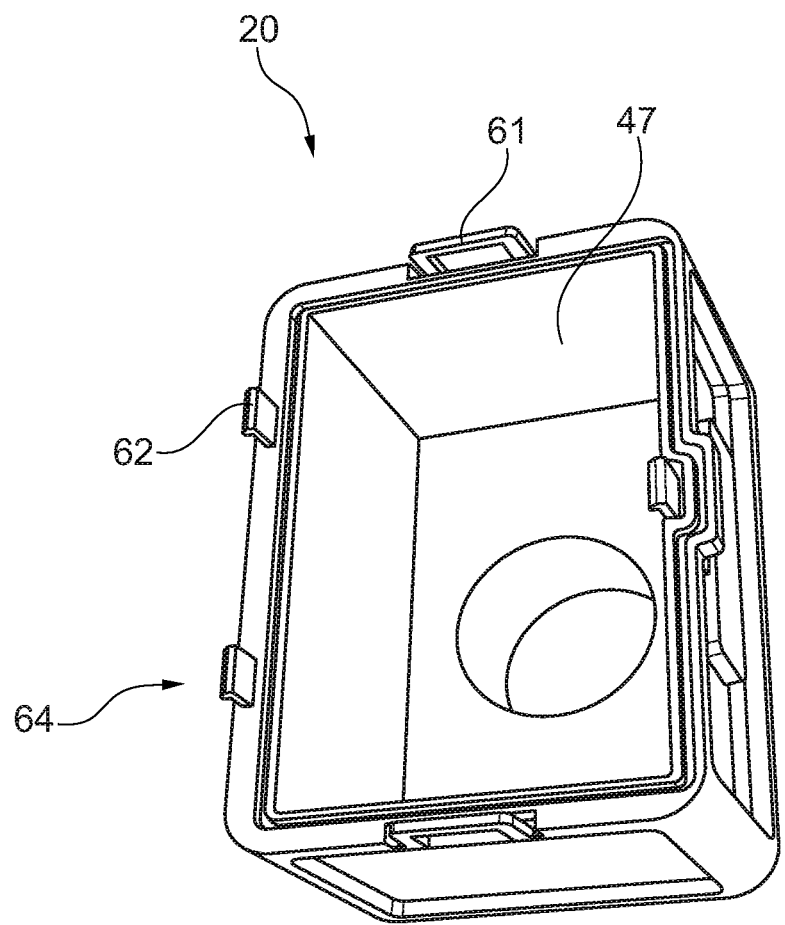
FIG. 5 is a perspective view of a base module of the modular distribution box of the FIG. 1.
Figure 6:
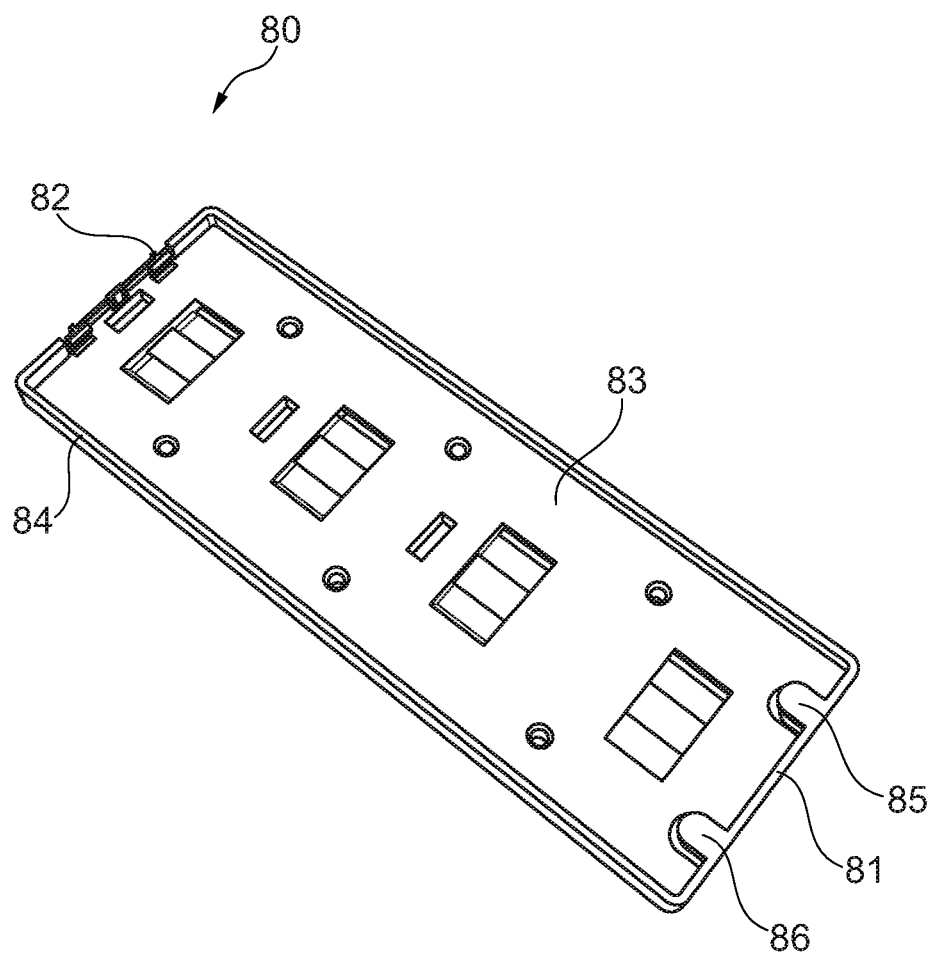
FIG. 6 is a perspective view of a retaining element of the modular distribution box of the FIG. 1.

FIG. 1 shows a distribution box 1 which is used for joining a hybrid input cable to up to a desired number X of hybrid output cables and RRH (Remote Radio Head) in Fiber-to-the-Antenna (FTTA) application. The cable comprises optical and/or electrical conductors. The distribution box 1 can be used in fiber and/or power only application as a PBO box for example and have splicing inside rather than the preterminations. Inputs cables and outputs cables can be flexible i.e., multiple-connector outputs, "standard" cable gland outputs, preterminated entry, "standard" cable gland entry.

The distribution box 1 comprises a plurality of modules 10 arranged in a stacked relationship along a longitudinal direction X-X. Therefore, each module 10 is connected to at least one adjacent module 10, which is adjacent thereto along the longitudinal direction X-X. Preferably, the stacked modules 10 are arranged mutually on top of each other along the longitudinal direction X-X.

The plurality of modules 10 comprises a base module 20, a cap module 30, and one or more distribution modules 40. Preferably, each module 10 is produced by injection molding. Therefore, each module 10 is a one-piece module.

The base module 20 has one or more inlet ports 21 for receiving one or more cables 2, comprising optical or electrical conductors. Preferably, each inlet port 21 is connectable to a distribution or trunk cable comprising, for examples, optical fibers and/or electrical conductor cables. More preferably, the base module 20 has a lower portion 22, such as a lower wall, and the one or more inlet ports 21 are formed within the lower portion 22. In the embodiment of the figures, the base module 20 further comprises peripheral walls protruding from the lower portion toward the cap module 30.

The cap module 30 is arranged at the opposite side of the base module 20 with respect to the one or more distribution modules 40. Preferably, the cap module 30 has an upper portion 31, such as an upper wall. Optionally, the cap module 30 may comprise peripheral walls protruding from the upper portion 31 towards the base module 20. In the illustrated embodiment, the cap module 30 comprises a peripheral rim protruding from the upper portion 31 towards the base module 20.

The one or more distribution modules 40 is arranged between the base module 20 and the cap module 30. Preferably, each distribution module 40 has one or more outlet ports 41 for cables connectable to antennas and/or other devices through electrical and/or optical connectors. More preferably, each distribution modules 40 is modular such that in the presence of more than one distribution modules 40 they are mutually interchangeable.

According to one embodiment, attachment members 60 are formed on each module 10 for attaching longitudinally the stacked modules 10. Preferably, the attachment members 60 removably and mutually fix the modules of the plurality of modules 10, and in particular couples of adjacent modules 10.

The attachment members 60 thereby prevent the mutual motion of the modules 10 along longitudinal direction X-X. It shall be noted that also movements of the modules 10 in directions other than the longitudinal direction X-X are prevented, until the attachment members 60 are released. Preferably, the attachment members 60 attach longitudinally and rotationally the stacked modules 10. In detail, mutual rotation of the modules 10 around a longitudinal direction X-X and mutual movement along the longitudinal direction X-X are prevented by the attachment members 60.

Preferably, the attachment members 60 of two adjacent modules 10 are complementary so that the attachment members 60 of two adjacent modules 10 are mutually coupled when the modules 10 are stacked.

According to one embodiment, the attachment members 60 comprises one or more seats 61 and one or more protrusions 62 configured to engage and fit in a respective seat 61 for attaching longitudinally adjacent modules 10. Preferably, each protrusion 62 is removably attached in a respective seat 61. More preferably, each protrusion 62 is elastically deformable along a direction transversal to the longitudinal direction X-X for locking and/or unlocking inside a respective seat 61. Even more preferably, each protrusion 62 comprises a tooth 65 configured to couple with a respective seat deforming elastically and attach the protrusion 62 to the seat 61. The seat 61 and protrusion 62 are for example a slot and a clip, or they provide a snap-fit arrangement.

According to a preferred embodiment, the seat 61 and protrusion 62 are configured to attach rotationally and longitudinally the stacked modules 10.

According to one embodiment each module 10 has at least one connecting portion 11 which faces the connecting portion 11 of an adjacent module 10. Preferably, the attachment members 60 are formed on the connecting portions 11 of each module. More preferably, the attachment members 60 of each module are spaced apart along the connecting portion 11 for maximizing the longitudinal attachment of the adjacent modules 10, and for preventing reciprocal movement of the modules 10 transversally to the longitudinal direction X-X. Conversely, the attachment of mutually adjacent modules 10 by a single couple of respective attachment members 60 may result in an unstable connection, depending on the shape of the attachment members 60.

According to one embodiment, the connecting portion 11 has an outer peripherical surface 12 and the attachment members 60 are arranged within or flush with the outer peripherical surface 12. Preferably, the connecting portion 11 has an inner peripherical surface 16 such that the attachment members 60 are arranged between the inner peripherical surface 16 and the outer peripherical surface 12. More preferably, each module has at least one connecting edge 17 at which each module 10 is connected to the adjacent module 10. Each connecting edge 17 is defined between the inner peripherical surface 16 and the outer peripherical surface 12.

Even more preferably, one or more seats 61 and/or one or more protrusions 62 are formed on the connecting edge 17. Each protrusion 62 extends along the longitudinal direction X-X from the connecting edge 17. However, in the embodiment of the figures, no attachment member 60 projects out of the connecting edge 17 in directions perpendicular to the longitudinal direction X-X.

According to one embodiment, one or more seats 61 extending along the longitudinal direction X-X from the connecting edge 17 have a C shape with the ends connected to the connecting edge 17. Such C-shaped seat may protrude from the connecting edge 17 along the longitudinal direction X-X. According to an alternative embodiment, one or more seats 61 extend inside the connecting edge 17 between the inner peripherical surface 16 and the outer peripherical surface 12. According to an alternative embodiment, each module 10 comprises a set of C shaped and internal seat 61.

According to one embodiment, the attachment members 60 comprise lower attachment members 63 and upper attachment members 64 formed on each distribution module. Further upper attachment members 64 are formed on the base module 20 and lower attachment members 63 are also formed on the cap module 30. Specifically, the lower attachment members 63 of a module 10 are configured to attach with the upper attachment members 64 of an adjacent module 10.

In the preferred embodiment, the upper attachment members 64 of a first distribution module 40 are configured to attach interchangeably with the lower attachment members 63 of further different modules 10, and in particular a second distribution module 40 and the cap module 30. Similarly, the lower attachment members 63 of the first distribution module 40 are configured to attach interchangeably with the upper attachment members 64 of still further different modules, such as the second distribution module 40 and the base module 20. In such embodiment, the first and second distribution modules 40 can be identical.

Accordingly, removal of some modules 10, which are preferably distribution modules 40 such as the second distribution module 40, is allowed to obtain a smaller distribution box 1 without compromising connection of the remaining modules 10. On the other hand, further distribution modules 40 having the aforementioned arrangement may be added between two modules 40 of the initial set to increase the number of outlet ports 41.

According to one embodiment, the upper attachment members 64 comprise only protrusions 62 and then the lower attachment members 63 comprise only seats 61 associated to the respective protrusion 62. In an alternative embodiment, the lower attachment members 63 comprise only protrusions 62 and the upper attachment members 64 comprise only seats 61 associated to the respective protrusions 62. In an alternative preferred embodiment, the upper attachment members 64 comprise an assembly of seats 61 and protrusions 62 and the lower attachment members 63 comprise a complementary assembly of seats 61 and protrusions 62 with respect of the upper attachment members 64.

According to one embodiment, each distribution module 40 extends between a lower connecting portion 42 and an upper connecting portion 43 defining respectively a lower opening 44 and an upper opening 45. Preferably, each distribution module 40 comprises a passing through channel 46 extending between the lower opening 44 and the upper opening 45 to allow passage of the optical or electrical conductors of the cables 2 from the inlet port 21 of the base module 20 to the outlet ports 41 of each distribution module 40. In more detail, each distribution module 40 comprises peripheral walls arranged around the passing through channel 46.

The connecting portions 11, and especially the upper and lower connecting portions 42, 43, can be identified with free end portions of the peripheral walls (or peripheral rims) of the respective modules 10. In such embodiment, the connecting edge 17 can be formed in the peripheral walls or rims of the respective module 10.

According to one embodiment, the passing through channels 46 of the distribution modules 40 define an inner volume 47 extending between the base module 20 and the cap module 30. In more detail, the inner volume is enclosed between the lower wall of the base module 20, the upper wall of the cap module 30, the peripheral walls of the one or more distribution modules 40, and optionally the peripheral walls of any other module 10 such as the base module 20 and the cap module 30. Preferably, one or more cables extend inside the inner volume 47 from the base module 20 to one or more outlet ports 41 of one or more distribution module 40.

According to one embodiment, the plurality of modules 10 stacked along the longitudinal direction X-X between the base module 20 and the cap module 30 defines a distribution portion 19, a first side portion 14 and a second side portion 15. Preferably, the distribution portion 19 has one or more outlet ports 41 of each distribution module 40. The first side portion 14 faces the distribution portion 19 and is spaced apart from the distribution portion 19 along a direction perpendicular to the longitudinal direction X-X. The second side portion 15 connects the distribution portion 19 to the first side portion 14. It shall be noted that the plurality of modules 10 may define two second side portions 15. Specifically, the first side portion 14, the second side portion 15, the distribution portion 19, the lower portion 23 of the base module 20 and the upper portion 31 of the cap module define the inner volume 47. According to an alternative embodiment, each distribution module comprises one or more outlet ports formed on the distribution portion 19 and on the second side portion 15.

According to one embodiment, the distribution box 1 comprises one or more seals 13 arranged at facing connecting portions 11 between adjacent modules 10 for sealing the inner volume 47. Preferably, each connecting edge 17 has a continuous groove 18 configured to accommodate at least a portion to a relative seal 13. More preferably, the upper portion the cap module 30 is configured to prevent infiltration inside the inner volume 47. Even more preferably, each seal 13, for example an O-ring seal, is configured to ensure sealing to IP standard, IP68.

According to one embodiment, the distribution box 1 comprises a retaining element 80 (i.e., a retaining structure), which is configured to act on the base module 20 and the cap module 30 to mutually urge the stacked modules 10 along the longitudinal direction X-X. Preferably, the retaining element 80 compresses the modules 10 along the longitudinal direction X-X acting on the base module 20 and the cap module 30. More preferably, the retaining element 80 is configured to maintain the modules 10 in a stacked configuration. Even more preferably, the retaining element 80 prevents excessive forces to act on the attachment members 60 when the distribution box 1 is installed with cables attached to the outlet ports 41.

According to one embodiment, the retaining element 80 extends between a lower portion 81 and an upper portion 82 along the longitudinal direction X-X and acts on the lower portion 23 of the base module 20 and on the upper portion 31 of the cap module 30. Preferably, the retaining element 80 acts on the lower portion 23 of the base module 20 and on the upper portion 31 of the cap module 30 proximal to the first side portion 14.

According to one embodiment, the retaining element 80 comprises a first side wall 83 extending between the lower portion 81 and upper portion 82 of the retaining element 80 and facing the first side portion 14 of the modules 10. Preferably, the first side wall 83 is configured to support the stacked modules 10 acting on the first side portion 14.

According to one embodiment, the retaining element 80 comprises a second side wall 84 projecting from the first side wall 83 along a transverse direction Y-Y perpendicular to the longitudinal direction X-X and partially surrounding the second side portion 15 of each module 10 adjacent to the first side portion 14. Preferably, the second side wall 84 is configured to allow the compression of the adjacent modules 10 and therefore of the seals 13.

According to one embodiment the retaining element 80 comprises lower retention members 85 and upper retention members 86 cooperating with lower retention members 85 and upper retention members 86 formed respectively on the lower portion 22 of the base module 20 and the upper portion 31 of the cap module 30.

Preferably, the retaining element 80 comprises lower retention members 85 at the lower portion 81 and upper retention members 86 at the upper portion 82. The lower retention members 85 and upper retention members 86 are configured to mutually attach with respective lower retention members 85 arranged on the base module 20 and upper retention members 86 arranged on the cap module 30. More preferably, lower retention members 85 and upper retention members 86 of the retaining element 80 are formed on the second side wall 84.

The lower retention members 85 and the upper retention members 86 of the base module 20 and the cap module 30 are mutually coupled with the lower retention members 85 and the upper retention members 86 of the retaining element 80 for attaching the retaining element 80 to the plurality of modules 10 in the stacked arrangement. Preferably, the retaining element 80 is removably attached to the plurality of modules in the stacked arrangement.

In the preferred embodiment, the lower retention members 85 of the base module 20 are configured to be inserted into the lower retention members 85 of the retaining element 80 by sliding along the first side wall 83 of the retaining element 80. Instead, the upper retention members 86 of the cap module 30 are configured to snap engage with the upper retention members 86 of the retaining element 80.

In the embodiment of the figures, the retaining element 80 is provided with (conventional) fasteners configured to fasten the first side wall 83 of the retaining element 80 to an antenna pole. Such fasteners are preferably arranged on the first side wall 83 of the retaining element 80, facing away from the modules 10.

What is claimed is:

1. A distribution box for cables, the distribution box comprising:
a plurality of modules arranged in a stacked relationship along a longitudinal direction, the plurality of modules comprising:
a base module having an inlet port for receiving one or more cables,
a cap module,
one or more distribution modules arranged between the base module and the cap module, each of the one or more distribution modules having one or more outlet ports, wherein each module of the plurality of modules comprises attachment members for longitudinally attaching the plurality of modules; and
a retaining structure configured to orient the plurality of modules along the longitudinal direction, the retaining structure extending between a lower portion of the retaining structure and an upper portion of the retaining structure along the longitudinal direction and configured to be attached on to a lower portion of the base module and on to an upper portion of the cap module.

2. The distribution box according to claim 1, wherein the attachment members comprise one or more seats and one or more protrusions configured to engage and fit in a respective seat for longitudinally attaching the plurality of modules.

3. The distribution box according to claim 1, wherein the attachment members are configured to removably fix the plurality of modules.

4. The distribution box according to claim 1, wherein each module of the plurality of modules has at least one connecting portion facing the connecting portion of a module of the plurality of modules, the attachment members being formed on the connecting portions.

5. The distribution box according to claim 4, wherein the attachment members are spaced apart along the connecting portion.

6. The distribution box according to claim 4, wherein the connecting portion has an outer peripheral surface and the attachment members are arranged within or flush with the outer peripheral surface.

7. The distribution box according to claim 1, wherein the attachment members comprise:
lower attachment members and upper attachment members disposed on each distribution module of the one or more distribution modules,
upper attachment members disposed on the base module,
lower attachment members disposed on the cap module,
the lower attachment members of a distribution module of the one or more distribution modules and the cap module are configured to attach with the upper attachment members of the base module and a distribution module of the one or more distribution modules along the longitudinal direction.

8. The distribution box according to claim 7, wherein the one or more distribution modules comprise a first distribution module and a second distribution module, wherein:
the upper attachment members of the first distribution module are configured to attach interchangeably with the lower attachment members of the second distribution module and with the lower attachment members of the cap module, and
the lower attachment members of the first distribution module are configured to attach interchangeably with the upper attachment members of the second distribution module and with the upper attachment members of the base module.

9. The distribution box according to claim 1, wherein:
each distribution module of the one or more distribution modules extends between a lower connecting portion and an upper connecting portion defining respectively a lower opening and an upper opening and comprises a pass through channel extending between the lower opening and the upper opening to allow passage of optical or electrical conductors of the cables from the inlet port of the base module to the outlet ports of each of the one or more distribution modules.

10. The distribution box according to claim 9, wherein:
the pass through channels of the one or more distribution modules define an inner volume extending between the base module and the cap module, and
one or more seals are arranged at the facing connecting portions between plurality of modules for sealing the inner volume.

11. The distribution box according to claim 1, wherein:
the retaining structure comprises lower retention members and upper retention members cooperating with lower retention members and upper retention members formed respectively on the lower portion of the base module and the upper portion of the cap module.

12. The distribution box according to claim 11, wherein:
the retaining structure comprises a first side wall extending between the lower portion and upper portion of the retaining structure and facing a first side portion of each module of the plurality of modules.

13. The distribution box according claim 12, wherein:
the retaining structure comprises a second side wall projecting from the first side wall along a transverse direction perpendicular to the longitudinal direction and partially surrounding a second side portion of each module of the plurality of modules adjacent to the first side portion.

14. The distribution box according to claim 1, wherein the attachment members are further configured to rotationally attach the plurality of modules.

15. The distribution box according to claim 2, wherein each protrusion is elastically deformable along a direction transversal to the longitudinal direction for locking or unlocking inside a respective seat.

16. A distribution box comprising:
a base module having an inlet port, at a first side, for receiving a cable oriented along a first direction at the inlet port, the base module comprising a base attachment member at a second side opposite the first side, the base attachment member having a first member at the second side and a second member at the second side, the first member being aligned with the second member along a second direction perpendicular to the first direction;
a cap module disposed over the base module and comprising a cap attachment member;
a distribution module disposed between the base module and the cap module so that the base module, the distribution module and the cap module are in a stacked configuration along the first direction, the distribution module comprising an outlet port, wherein the base module is attached to the distribution module through a first attachment member of the distribution module and the base attachment member, wherein the cap module is attached to the base attachment member through the cap attachment member, the first attachment member, and a second attachment member of the distribution module; and a retaining structure configured to act on the base module and the cap module to orient the base, the distribution, and the cap modules along a first direction, the retaining structure being attached to a major surface of the stacked configuration comprising the first direction and the second direction.

17. The distribution box according to claim 16, wherein the first and the second attachment members comprise one or more seats and one or more protrusions configured to engage and fit in a respective seat for attaching the distribution module to the base module and the cap module.

18. The distribution box according to claim 16, further comprising:
a first connecting portion comprising the first attachment member and a second connecting portion comprising the second attachment member; and
a base connecting portion facing the first connecting portion, the base connecting portion comprising the base attachment member.

19. The distribution box according to claim 18, wherein the distribution module extends between the first connecting portion and the second connecting portion defining respectively a lower opening and an upper opening and comprises a pass through channel extending between the lower opening and the upper opening to allow passage of the cable from the inlet port of the base module to the outlet port of the distribution module.

20. The distribution box according to claim 19, wherein the pass through channel defines an inner volume extending between the base module and the cap module, wherein a seal is disposed at the first connecting portion facing the base connecting portion for sealing the inner volume.

21. A distribution box comprising:
a base module having an inlet port for receiving a cable oriented along a first direction at the inlet port, the base module comprising a base attachment member at an upper portion and an opposite lower portion proximate the inlet port;
a cap module disposed over the base module, the cap module comprising a cap attachment member at a lower portion and an opposite upper portion;
a distribution module disposed between the base module and the cap module to form a stacked module comprising the base module, the distribution module, and the cap module, the distribution module comprising an outlet port, wherein the base module is attached to the distribution module through a first attachment member of the distribution module and the base attachment member, wherein the cap module is attached to the base attachment member through the cap attachment member, the first attachment member, and a second attachment member of the distribution module; and
a retaining structure configured to act on the base module and the cap module to orient the base, the distribution, and the cap modules along the first direction, wherein the retaining structure comprises a first edge and an opposite second edge parallel to the first edge, a third edge and an opposite fourth edge parallel to the third edge, the third edge being perpendicular to the first edge, wherein the first edge, the second edge, the third edge, and the fourth edge is detachably joined with a major surface of a stacked module.

* * * * *